(12) United States Patent
Kruglick

(10) Patent No.: US 8,910,173 B2
(45) Date of Patent: Dec. 9, 2014

(54) DATACENTER RESOURCE ALLOCATION

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 232 days.

(21) Appl. No.: 13/580,512

(22) PCT Filed: Nov. 18, 2011

(86) PCT No.: PCT/US2011/061382
§ 371 (c)(1),
(2), (4) Date: Aug. 22, 2012

(87) PCT Pub. No.: WO2013/074116
PCT Pub. Date: May 23, 2013

(65) Prior Publication Data
US 2013/0185722 A1 Jul. 18, 2013

(51) Int. Cl.
*G06F 9/50* (2006.01)
*G06F 9/455* (2006.01)
*G06Q 10/06* (2012.01)

(52) U.S. Cl.
CPC .............. *G06F 9/50* (2013.01); *G06F 9/45533* (2013.01); *G06Q 10/063* (2013.01); *G06F 2209/508* (2013.01); *G06F 2209/501* (2013.01); *G06F 9/5044* (2013.01)
USPC .......................................... 718/104; 709/226

(58) Field of Classification Search
None
See application file for complete search history.

(56) References Cited

U.S. PATENT DOCUMENTS

| 7,356,819 | B1  |   | 4/2008  | Ricart et al. |         |
|-----------|-----|---|---------|---------------|---------|
| 8,132,185 | B2  | * | 3/2012  | Ben-Yehuda et al. | 719/320 |
| 8,413,159 | B2  | * | 4/2013  | Ben-Yehuda et al. | 718/104 |
| 2004/0199621 | A1 |   | 10/2004 | Lau |         |
| 2006/0195846 | A1 | * | 8/2006  | Benedetti | 718/102 |
| 2009/0083737 | A1 | * | 3/2009  | Ben-Yehuda et al. | 718/100 |

OTHER PUBLICATIONS

Iyer, R., et al., Virtual platform architectures for resource metering in datacenters, ACM SIGMETRICS Performance Evaluation Review, 2009, vol. 37, No. 2, pp. 89-90.

Son, Wooram, et al., Sub-fingerprint masking for a robust audio fingerprinting system in a real-noise environment for portable consumer devices, IEEE Transactions on Consumer Electronics, Feb. 2010, 56, No. 1, pp. 156-160.

Mishra, A.K., et al., Towards characterizing cloud backend workloads: insights from Google compute clusters, ACM SIGMETRICS Performance Evaluation Review, Mar. 2010, 37,pp. 34-41, ACM, New York, USA.

Bodík, P., et al., Fingerprinting the datacenter: automated classification of performance crises, in Proceedings of the 5th European conference on Computer systems, 2010,pp. 111-124, ACM, New York, USA.

Geer, D., Reducing the storage burden via data deduplication, Computer, Dec. 2008, vol. 41, No. 12, pp. 15-17.

Tatsubori, M., et al., A bytecode translator for distributed execution of 'legacy' Java software, ECOOP '01 Proceedings of the 15th European Conference on Object-Oriented Programming, 2001, pp. 236-255, Springer-Verlag, London, UK.

Welcome to the SAX homepage, SAX (Symbolic Aggregate approXimation) Homepage, 2011, accessed on Jun. 5, 2012 via http://www.cs.ucr.edu/~eamonn/SAX.htm.

(Continued)

*Primary Examiner* — Qing Wu

(57) ABSTRACT

Technologies and implementations for allocating datacenter resources are generally disclosed.

20 Claims, 7 Drawing Sheets

(56) References Cited

OTHER PUBLICATIONS

Jin, X., et al., Indexing and mining of the local patterns in sequence database, Proceedings of the 3rd International Conference on Intelligent Data Engineering and Automated Learning, 2002, pp. 68-73, Springer-Verlag, London, UK.

Keogh, E.J., et al., Finding surprising patterns in a time series database in linear time and space, Proceedings of the 8th ACM SIGKDD International Conference on Knowledge Discovery and Data Mining, 2002, pp. 550-556, ACM, New York, USA.

Reves, J., et al., Traffic monitoring with packet-based sampling for defense against security threats, InMon Technology Whitepaper, 2002.

Ahmed, S., et al., ETS (Efficient, Transparent, and Secured) self-healing service for pervasive computing applications, International Journal of Network Security, 2007, vol. 4, No. 3, pp. 271-281.

Kaiser, G., et al., An approach to autonomizing legacy systems, Workshop on Self-healing, Adaptive and Self-MANaged systems, 2002.

Valentino-DeVries, J., More predictions of the huge growth of "cloud computing," The Wall Street Journal Blogs, Apr. 21, 2011, http://blogs.wsj.com/digits/2011/04/21/more-predictions-on-the-huge-growth-of-cloud-computing/.

United States Patent and Trademark Office, International Search Report and Written Opinion of the International Searching Authority for PCT/US2011/061382, mailed on Mar. 29, 2012.

Ren et al., Google-wide profiling: a continuous profiling infrastructure for data centers, in IEEE Micro, Jul.-Aug. 2010, vol. 30, No. 4, pp. 65-79, IEEE.

\* cited by examiner

300

| | Resource Set 1 | Resource Set 2 | ... | Resource Set Y |
|---|---|---|---|---|
| Task Fingerprint 1 | Task Behavior 1<br>Task Behavior 2<br>.<br>.<br>.<br>Task Behavior Z | Task Behavior 1<br>Task Behavior 2<br>.<br>.<br>.<br>Task Behavior Z | ... | Task Behavior 1<br>Task Behavior 2<br>.<br>.<br>.<br>Task Behavior Z |
| Task Fingerprint 2 | | Task Behavior 1<br>Task Behavior 2<br>.<br>.<br>.<br>Task Behavior Z | ... | |
| . . . | . . . | . . . | . . . | . . . |
| Task Fingerprint X | Task Behavior 1<br>Task Behavior 2<br>.<br>.<br>.<br>Task Behavior Z | Task Behavior 1<br>Task Behavior 2<br>.<br>.<br>.<br>Task Behavior Z | ... | |

| | Task Fingerprint 1 | Task Fingerprint 2 | ... | Task Fingerprint X |
|---|---|---|---|---|
| Task Fingerprint 1 | Task Behavior 1<br>Task Behavior 2<br>.<br>.<br>.<br>Task Behavior Z | Task Behavior 1<br>Task Behavior 2<br>.<br>.<br>.<br>Task Behavior Z | ... | Task Behavior 1<br>Task Behavior 2<br>.<br>.<br>.<br>Task Behavior Z |
| Task Fingerprint 2 | | Task Behavior 1<br>Task Behavior 2<br>.<br>.<br>.<br>Task Behavior Z | ... | |
| .<br>.<br>. | | | .<br>.<br>. | |
| Task Fingerprint X | Task Behavior 1<br>Task Behavior 2<br>.<br>.<br>.<br>Task Behavior Z | Task Behavior 1<br>Task Behavior 2<br>.<br>.<br>.<br>Task Behavior Z | ... | Task Behavior 1<br>Task Behavior 2<br>.<br>.<br>.<br>Task Behavior Z |

420 (top header), 410 (left column), 430, 440, 450

Fig. 4

600 A computer program product

602 A signal bearing medium

604 Machine-readable instructions that, when executed, cause a datacenter to allocate resources or generate a task fingerprint and resource allocation database by:

receiving a task;

generating a task fingerprint based at least in part on the received task;

comparing the task fingerprint to a plurality of reference task fingerprints to determine a closest match reference task fingerprint from the plurality of reference task fingerprints;

determining a reference task behavior profile related to the closest match reference task fingerprint;

allocating one or more resources to perform the received task based at least in part on the reference task behavior profile;

performing the task using the allocated resources;

gathering one or more performance metrics based at least in part on the performance of the task;

updating the reference task behavior profile related to the closest match reference task fingerprint based at least in part on the one or more performance metrics;

receiving a second task;

generating a second task fingerprint based at least in part on the received second task;

comparing the second task fingerprint to the plurality of reference task fingerprints;

determining the closest match reference task fingerprint is the closest match to the second task fingerprint;

allocating second resources to perform the received second task based at least in part on the updated reference task behavior profile;

receiving a plurality of tasks;

generating a task fingerprint for each received task to form a plurality of task fingerprints;

allocating a resource set to each received task to define a plurality of allocated resource sets;

performing each received task using the respective allocated resource set;

gathering a task behavior for each performed task using the allocated resource set to generate a plurality of task behaviors;

relating each task fingerprint, allocated resource set, and task behavior to generate the task fingerprint and resource allocation database comparing at least a first and a second task fingerprint of the plurality of task fingerprints;

determining whether the first and the second task fingerprints substantially match; or if the first and the second task fingerprints substantially match: relating database entries for the first and the second task fingerprints as a common task fingerprint entry.

| 606 a computer-readable medium | 608 a recordable medium | 610 a communications medium |
|---|---|---|

Fig. 6

DATACENTER RESOURCE ALLOCATION

BACKGROUND

Unless otherwise indicated herein, the approaches described in this section are not prior art to the claims in this application and are not admitted to be prior art by inclusion in this section.

Current datacenters may perform tasks for clients by allocating resources at the datacenter to the tasks. With conventional datacenters, the resources may be inefficiently allocated and, in some instances, the colocation of certain tasks to shared hardware may stress and/or inefficiently utilize the shared hardware.

SUMMARY

The present disclosure describes examples methods for allocating datacenter resources and/or generating a task fingerprint and resource allocation database. Example methods for allocating resources at a datacenter may include receiving a task at the datacenter, generating a task fingerprint based on the received task, comparing the task fingerprint to a plurality of reference task fingerprints to determine a closest match reference task fingerprint, determining a reference task behavior profile related to the closest match reference task fingerprint, and allocating resources to perform the received task based on the reference task behavior profile.

Example methods for generating a task fingerprint and resource allocation database may include receiving a plurality of tasks at a datacenter, generating a task fingerprint for each received task to form a plurality of task fingerprints, allocating a resource set to each received task to define a plurality of allocated resource sets, performing each received task using the respective allocated resource set, gathering a task behavior for each performed task using the allocated resource set to generate a plurality of task behaviors, and relating, in a database at the datacenter, each task fingerprint, allocated resource set, and task behavior to generate the task fingerprint and resource allocation database.

The present disclosure also describes example machine readable non-transitory medium having stored therein instructions that, when executed, cause a datacenter to allocate datacenter resources and/or generate a task fingerprint and resource allocation database. Example machine readable non-transitory media may have stored therein instructions that, when executed, cause a datacenter to allocate datacenter resources by receiving a task at the datacenter, generating a task fingerprint based on the received task, comparing the task fingerprint to a plurality of reference task fingerprints to determine a closest match reference task fingerprint, determining a reference task behavior profile related to the closest match reference task fingerprint, and allocating resources to perform the received task based on the reference task behavior profile.

Example machine readable non-transitory media may have stored therein instructions that, when executed, cause a datacenter to generate a task fingerprint and resource allocation database by receiving a plurality of tasks at a datacenter, generating a task fingerprint for each received task to form a plurality of task fingerprints, allocating a resource set to each received task to define a plurality of allocated resource sets, performing each received task using the respective allocated resource set, gathering a task behavior for each performed task using the allocated resource set to generate a plurality of task behaviors, and relating, in a database at the datacenter, each task fingerprint, allocated resource set, and task behavior to generate the task fingerprint and resource allocation database.

The present disclosure also describes example datacenters for allocating datacenter resources and/or generating a task fingerprint and resource allocation database. Example datacenters may include a processor and a machine readable medium having stored therein instructions that, when executed, cause a datacenter to allocate resources by receiving a task at the datacenter, generating a task fingerprint based on the received task, comparing the task fingerprint to a plurality of reference task fingerprints to determine a closest match reference task fingerprint, determining a reference task behavior profile related to the closest match reference task fingerprint, and allocating resources to perform the received task based on the reference task behavior profile.

Example datacenters may include a processor and a machine readable medium having stored therein instructions that, when executed, cause a datacenter to generate a task fingerprint and resource allocation database by receiving a plurality of tasks at a datacenter, generating a task fingerprint for each received task to form a plurality of task fingerprints, allocating a resource set to each received task to define a plurality of allocated resource sets, performing each received task using the respective allocated resource set, gathering a task behavior for each performed task using the allocated resource set to generate a plurality of task behaviors, and relating, in a database at the datacenter, each task fingerprint, allocated resource set, and task behavior to generate the task fingerprint and resource allocation database.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 3 is an illustration of a table of an example data structure for related task fingerprint, allocated resource set, and task behavior information;

FIG. 4 is an illustration of a table of an example data structure for related task fingerprints and task behavior information;

FIG. 6 is an illustration of an example computer program product; and

DETAILED DESCRIPTION

Figure 1:
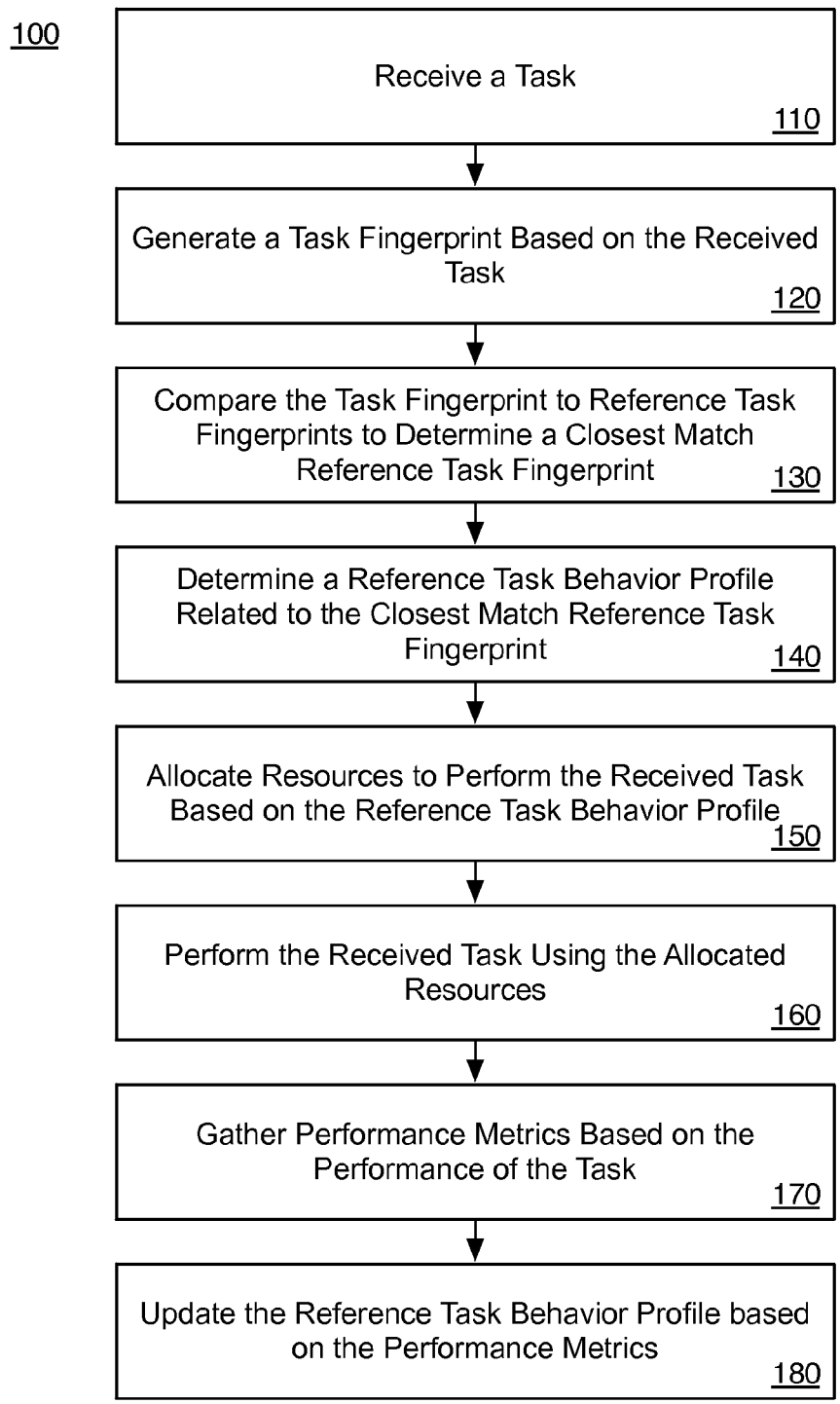
FIG. 1 is an illustration of a flow diagram of an example method for allocating resources.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to allocating datacenter resources.

In some examples, a task may be received at a datacenter. In some examples, a task fingerprint may be generated for the received task and the task fingerprint may be used to determine a closest match reference task fingerprint for the task fingerprint. In various examples, the task fingerprint and the closest match reference task fingerprint may be perfect matches or imperfect matches (such that the closest match may be a surrogate for the task fingerprint). In some examples, a task behavior profile related to the closest match task fingerprint may be used to allocate datacenter resources for performing the received task. In some examples, the task behavior profile may include preferred hardware to perform the task and conflict tasks (i.e., tasks with which the task should not share resources). In some examples, during performance of the task, the task performance may be monitored and performance metrics may be gathered such that either the task behavior profile may be updated (if a perfect match existed) or a new task behavior profile entry may be created for the newly identified task fingerprint. Such methods may be repeated as needed for received tasks and/or to improve a task behavior profile database.

In some examples, the discussed techniques may be used to produce a task fingerprint and resource allocation database. In some examples, the database may be used at the datacenter. In some examples, the database may be provided to another datacenter or a newly implemented datacenter to improve the performance at that datacenter. In some examples, the database may be produced in the course of completing tasks for clients. In some examples, the database may be produced in response to a group of prepared tasks.

FIG. 1 is an illustration of a flow diagram of an example method 100 for allocating resources, arranged in accordance with at least some embodiments of the present disclosure. In general, method 100 may be performed by any suitable device, devices, or system such as those discussed herein. In some examples, method 100 may be performed by a datacenter or datacenter cluster, or the like. In some examples, method 100 may be performed by a cloud computing service. In some examples, method 100 may be performed by an Infrastructure as a Service (IaaS) provider or a Platform as a Service (PaaS) provider, or the like. In some examples, method 100 may be performed by system as discussed herein with respect to FIG. 7.

Method 100 sets forth various functional blocks or actions that may be described as processing steps, functional operations, events and/or acts, etc., which may be performed by hardware, software, and/or firmware. Numerous alternatives to the functional blocks shown in FIG. 1 may be practiced in various implementations. For example, intervening actions not shown in FIG. 1 and/or additional actions not shown in FIG. 1 may be employed and/or some of the actions shown in FIG. 1 may be eliminated, without departing from the scope of claimed subject matter. Method 100 may include one or more of functional operations as indicated by one or more of blocks 110, 120, 130, 140, 150, 160, 170 and/or 180. The process of method 100 may begin at block 110.

At block 110, "Receive a Task", a task may be received at a datacenter, for example. In general, the task may be received using any suitable communications technique or techniques. In general, the received task may include any suitable task, group of tasks, or subtask, or the like. In some examples, the task may be an application. In some examples, the task may be a process. In some examples, the task may be a standard and/or library task provided by the datacenter. In some examples, the task may be a client written task. In general, the task may be received from any suitable client, client system, or user system, or the like. The process of method 100 may continue at block 120.

At block 120, "Generate a Task Fingerprint Based on the Received Task", a task fingerprint may be generated, at the datacenter, based at least in part on the received task. In general, the task fingerprint may be generated using any suitable technique or techniques that may enable recognition and/or matching of recurring tasks received at the datacenter. In general, a task fingerprint may include a compact representation of the task. In some examples, the task fingerprint may be generated by identifying and/or mapping subtasks within the task. In some examples, the task fingerprint may be generated by performing a hash function on the received task. In some examples, the task fingerprint may be generated by sub-fingerprint masking some of a multiple number of subtasks within the task and identifying unmasked subtasks of the task. In such implementations, algorithms may be used as analogous to those used in audio fingerprinting applications, for example. In some examples, the task fingerprint may be generated by performing a tree flow extraction on the received task and providing a symbolic approximation representation of the tree flow extraction, as is discussed further herein and, in particular, with respect to FIG. 5 below.

In general, the task fingerprint may be performed by any suitable resource of a datacenter as discussed herein such as, for example, a computer, a multiple number of computers, a server, a computing resource, a virtual machine, or a computing cluster, or the like. In some examples, the task fingerprint may be performed by a dedicated computing resource. In some examples, the task fingerprint may be performed by a task fingerprint generator at the datacenter. In some examples, generating the task fingerprint may include accessing the received task using a hypervisor level access, a board level access, a processor core level access, or a virtual machine level access, or the like.

As discussed, in some examples, a task fingerprint may be generated at a datacenter. In some examples, a task fingerprint may be received from a client such as, for example, a client system, or user system, or the like. In such examples, the processing required to generate a task fingerprint may thereby be offloaded from the data center to the client side. In general, the task fingerprint may be formed at the client side using any of the techniques discussed herein and the task fingerprint may be transmitted from the client side using any suitable communications techniques. The process of method 100 may continue at block 130.

At block 130, "Compare the Task Fingerprint to Reference Task Fingerprints to Determine a Closest Match Reference Task Fingerprint", the generated task fingerprint may be compared to one or more reference task fingerprints to determine a closest match reference task fingerprint. In general, the comparison may be made using any suitable technique or techniques. In some examples, the comparison may include comparing the results of hash functions related to the task fingerprint and the reference task fingerprints. In some examples, the comparison may include comparing the results of sub-fingerprint masking related to the task fingerprint and the reference task fingerprints. In some examples, the comparison may include comparing the results of tree flow extractions and symbolic representations related to the task fingerprint and the reference task fingerprints. In some examples, each comparison between the task fingerprint and a reference task fingerprint may generate a similarity score and the highest similarity score may provide the closest match. In general, the task fingerprint may be performed by any suitable resource of a datacenter as discussed herein. In some examples, the fingerprint comparison may be performed by a dedicated computing resource. In some examples, the fingerprint comparison may be performed by a task manager at the datacenter. The process of method 100 may continue at block 140.

At block 140, "Determine a Reference Task Behavior Profile Related to the Closest Match Reference Task Fingerprint", a reference task behavior profile related to the closest match reference task fingerprint may be determined. In general, the reference task behavior profile may be determined using any suitable technique or techniques. In some examples, the comparison discussed at block 130 may generate a score or ranking for each comparison such that a highest score or ranking may indicate a closest match reference task fingerprint. In some examples, the task fingerprint and the closest match reference task fingerprint may be an exact or perfect match such that the match may indicate the task has been performed previously at the datacenter. In some examples, the task fingerprint and the closest match reference task fingerprint may not be an exact or perfect match. In such examples, the closest match reference task fingerprint may be considered a surrogate of the task such that the task may be allocated resources and completed as if it were a match to the closest match reference task fingerprint. In some examples, allowances and/or adjustments to the allocated resources may be made based on the closeness of match. In general, the task fingerprint may be performed by any suitable resource of a datacenter as discussed herein. In some examples, the fingerprint comparison may be performed by a dedicated computing resource. In some examples, the fingerprint comparison may be performed by a task manager at the datacenter.

In general, a task behavior profile may include any information related to performing the task at the datacenter. In some examples, the task behavior profile may include a preferred set of resources for performing the task. In some examples, a set of resources may include a processor type and/or capability, a typical task duration, a memory type and/or amount, a cache space, or a virtual machine type or capability, or the like. In some examples, the task behavior profile may include one or more conflict tasks such that a conflict task may indicate that if the conflict task and the task may be allocated to the same resources, a substantial slowdown and/or inefficiency may occur. As will be appreciated, when sharing resources, in many instances a minimal or moderate inefficiency may occur. In some examples, a conflict resource may exist if the inefficiency may be above a predetermined threshold. In some examples, the predetermined threshold may be a 50% slowdown. In some examples, the predetermined threshold may be a 100% slowdown. In some examples, the predetermined threshold may be a 200% slowdown. In some implementations, the performance reduction may include a task duration of five times a standard task duration. In some examples, allocating resources to perform the received task may include allocating resources different than those being used by one or more of the conflict tasks. The process of method 100 may continue at block 150.

At block 150, "Allocate Resources to Perform the Received Task Based on the Reference Task Behavior Profile", resources, at the datacenter, may be allocated to perform the received task based at least in part on the reference task behavior profile. In general, the resources may be allocated using any suitable technique or techniques. In some examples, the resources may be allocated by a task manager at the datacenter. As discussed, in some examples, the task behavior profile may include one or more conflict tasks. In some examples, allocating resources to perform the received task may include allocating resources different than those being used by one or more of the conflict tasks. In such examples, the resources may be allocated based on colocation data obtained over time at the datacenter as discussed herein. As will be appreciated, avoiding such colocation performance inefficiencies may cause substantial performance improvements at the datacenter.

In some examples, the resources may be allocated based on the identification of resource types, quantities, or combinations, or the like that may most efficiently perform the task. In general, the allocated resources may include any suitable resources. In some examples, the allocated resources may include a processor, a memory, a cache space, or a virtual machine. As discussed, in some examples, the task fingerprint may not be a perfect match to the reference task fingerprint and a closest match reference task fingerprint or task surrogate may be used. The discussed techniques may provide effective approximation matching for such task fingerprints such that the received task may be substantially optimized based on the use of resources optimized for the closest match reference task fingerprint or task surrogate. The process of method 100 may continue at block 160.

At block 160, "Perform the Received Task Using the Allocated Resources", the received task may be performed using the allocated resources. In general, the received task may be performed using any suitable technique or techniques and may implement the allocated resources as discussed at block 150. In some examples, the allocated resources may be available continuously for the completion of the received task. In some examples, the allocated resources may be unavailable, become unavailable, or fail, or the like during the performing of the received task. In such examples, the datacenter may allocate other resources to perform the received task. The process of method 100 may continue at block 170.

At block 170, "Gather Performance Metrics Based on the Performance of the Task", performance metrics based on the performance may be gathered. In general, the performance metrics may be gathered using any suitable technique or techniques. In general, the gathering of performance metrics may be performed by any suitable resource of a datacenter as discussed herein. In some examples, the gathering of performance metrics may be performed by a dedicated computing resource. In some examples, the gathering of performance metrics may be performed by a task profiler at the datacenter. In some examples, the performance metrics may be collected via hypervisors. In some examples, the performance metrics may be collected via modified virtual machines such as a virtual platform architecture, or the like. Such modified virtual machines may provide visibility to operating system and/or virtual machine statuses including cache usage or memory bandwidth, or the like. In some examples, the performance metrics may be gathered using packet based network usage monitoring at a datacenter.

In general, the performance metrics may include any suitable performance metrics. In some examples, the performance metrics may include datacenter management-relevant metrics. In some examples, the performance metrics may include a task duration (i.e., how long a task takes to complete), a central processing unit (CPU) usage, a memory usage, a network usage, a storage volume usage, a storage volume access frequency, a state of change of memory use, or a network traffic change over time, or the like. In some examples, the performance metrics may include predictive metrics such that the metrics may include statistical probabilities of various occurrences. Such metrics may be generated by analyzing a task that may be repeated numerous times at the datacenter and may include a probability of an occurrence. As an illustrative example, a particular task (and related task fingerprint) may have a 90% probability of generating a 2 GB data storage access. Further, a predictive metric may be prior activity-dependent such that the metric may have inputs. Using the discussed example, the 90% probability of generating 2 GB data storage access may occur after a 1 MB (or more) network delivery from another task or application. Such metrics may provide the advantages of being substantially flexible, accurate, and runtime specific. The process of method 100 may continue at block 180.

At block 180, "Update the Reference Task Behavior Profile based on the Performance Metrics", the reference task behavior profile may be updated based at least in part on the gathered performance metrics. In general, the reference task behavior profile may be updated using any suitable technique or techniques. In general, the task behavior profile may be updated by any suitable resource of a datacenter as discussed herein. In some examples, the task behavior profile may be updated by a dedicated computing resource. In some examples, task behavior profile may be updated at a task profiler at the datacenter. As is discussed further herein, the task behavior profile implemented as a database and the task behavior profile may be updated by updating information in the database. In general, an update to the task behavior profile may include any of the behavior profile information as discussed herein. As discussed, in some examples, a perfect or substantially perfect match may have been determined between the task fingerprint and the closest match reference task fingerprint. In such examples, an update to the task behavior profile may include updating the task behavior profile of the closest match reference task fingerprint. In some examples, the task fingerprint may be a newly identified task fingerprint and updating the task behavior profile may include providing a new fingerprint and a new behavior profile entry.

Method 100 and other techniques discussed herein may provide dynamic scheduling, dynamic capacity planning, substantial efficiencies, improved performance from the same hardware, or optimization and resource savings for a datacenter, particularly in the use of resources shared between two or more tasks. Method 100 may be performed any number of times as tasks may be received at a datacenter. In some examples, method 100 may be performed for all received tasks. In some examples, method 100 may be performed for a portion of the received tasks or in certain situations, such as during certain load levels within a datacenter. As discussed, a task may be received any one of a plurality of clients. In some examples, tasks received from different clients may be fingerprinted, compared and used to allocate resources as discussed herein. Such implementations may offer the advantage of providing substantially more information for characterizing tasks and allocating resources. Further, such implementations may offer the advantage of efficiently allocating resources for smaller clients, clients that use services less frequently, or new clients, or the like.

As discussed, techniques discussed herein may provide substantial efficiencies and resource savings for a datacenter. In some examples, a database may be generated that may be transferred to another datacenter, implemented at a new datacenter, or provided as a datacenter solution, or the like such that the information generated and retained may be leveraged for use at other datacenters.

Figure 2:
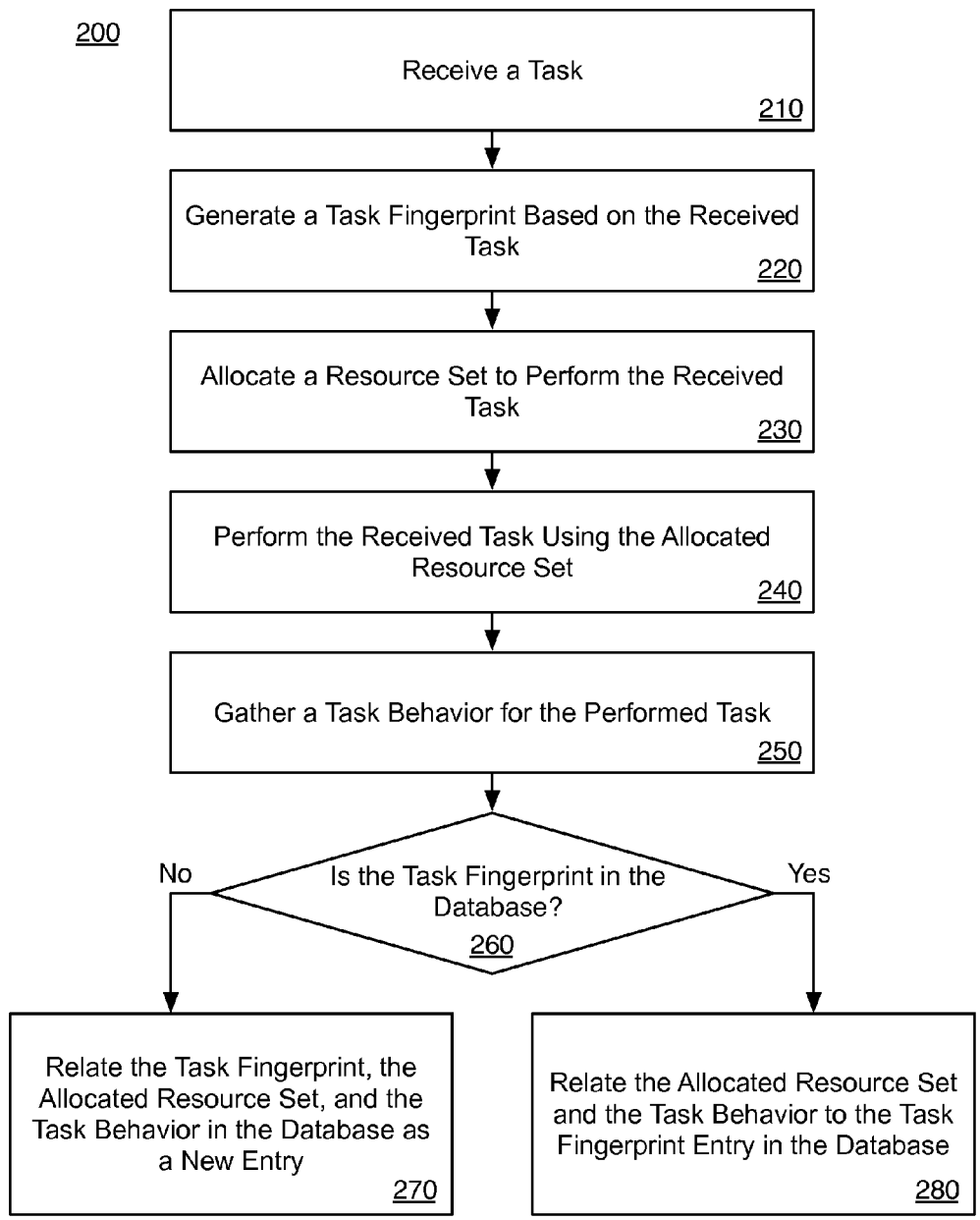
FIG. 2 is an illustration of a flow diagram of an example method for generating a task fingerprint and resource allocation database.

FIG. 2 is an illustration of a flow diagram of an example method 200 for generating a task fingerprint and resource allocation database, arranged in accordance with at least some embodiments of the present disclosure. In general, method 200 may be performed by any suitable device, devices, or system such as those discussed herein. In some examples, method 200 may be performed by a datacenter or datacenter cluster, or the like. In some examples, method 200 may be performed by a cloud computing service. In some examples, method 200 may be performed by system as discussed herein with respect to FIG. 7. In some examples, method 200 provides a task fingerprint and resource allocation database that may be transferred and/or transmitted to another datacenter or datacenter cluster, or the like.

Method 200 sets forth various functional blocks or actions that may be described as processing steps, functional operations, events and/or acts, etc., which may be performed by hardware, software, and/or firmware. Numerous alternatives to the functional blocks shown in FIG. 2 may be practiced in various implementations. For example, intervening actions not shown in FIG. 2 and/or additional actions not shown in FIG. 2 may be employed and/or some of the actions shown in FIG. 2 may be eliminated, without departing from the scope of claimed subject matter. Method 200 may include one or more of functional operations as indicated by one or more of blocks 210, 220, 230, 240, 250, 260, 270 and/or 280. The process of method 200 may begin at block 210.

At block 210, "Receive a Task", a task may be received at a datacenter, for example. In general, the task may be received using any suitable communications technique or techniques. In general, the received task may include any suitable task, group of tasks, or subtask, application, process or the like as discussed herein and, in particular, with respect to block 110 of method 100. The process of method 200 may continue at block 220.

At block 220, "Generate a Task Fingerprint Based on the Received Task", a task fingerprint may be generated, at the datacenter, based at least in part on the received task. In general, the task fingerprint may be generated using any suitable technique or techniques that may enable recognition and/or matching of recurring tasks received at the datacenter. Any of the methods or techniques discussed herein may be used to generate the task fingerprint and in particular, those discussed with respect to block 120 of method 100.

As discussed, in some examples, a task fingerprint may be generated at a datacenter. In some examples, a task fingerprint may be received from a client such as, for example, a client system, or user system, or the like. In such examples, the processing required to generate a task fingerprint may thereby be offloaded from the data center to the client side. In general, the task fingerprint may be formed at the client side using any of the techniques discussed herein and the task fingerprint may be transmitted from the client side using any suitable communications techniques. The process of method 200 may continue at block 230.

At block 230, "Allocate a Resource Set to Perform the Received Task", resources, at the datacenter, may be allocated to perform the received task. In general, the resources may be allocated using any suitable technique or techniques. In some examples, the resources may be allocated by a task manager at the datacenter. In some examples, the resources may be allocated to gather data on the task behavior during performance with the allocated resources. In some examples, the resources may be chosen randomly. In some examples, the resources may be chosen based on a resource template such that received tasks may all (at least initially) be performed with a baseline resource set. In some examples, the resources may be chosen based on characteristics of the task fingerprint. In some examples, the resources may be chosen based on a comparison to reference task fingerprints and a reference task behavior profile as discussed herein and, in particular, with respect to method 100. In some examples, it may be desirable to determine conflict tasks for the task. In some examples, allocating resources may include allocating resources already performing another task to determine whether a task conflict may exist. In some examples, it may be desirable to determine a minimal resource amount that may perform a task. In general, the allocated resources may include any suitable resources. In some examples, the allocated resources may include a processor, a memory, a cache space, or a virtual machine, or the like. The process of method 200 may continue at block 240.

At block 240, "Perform the Received Task Using the Allocated Resource Set", the received task may be performed using the allocated resources. In general, the received task may be performed using any suitable technique or techniques and may implement the allocated resources as discussed at block 230. The received task may be performed using any of the techniques discussed herein. The process of method 200 may continue at block 250.

At block 250, "Gather a Task Behavior for the Performed Task", performance metrics based on the performance may be gathered. In general, the performance metrics may be gathered using any suitable technique or techniques. In general, the gathering of performance metrics may be performed by any suitable resource of a datacenter as discussed herein. In some examples, the gathering of performance metrics may be performed by a dedicated computing resource such as a task profiler. In some examples, the performance metrics may be collected via hypervisors, via modified virtual machines such as a virtual platform architecture, or using packet based network usage monitoring, or the like.

In general, the performance metrics may include any suitable performance metrics. In some examples, the performance metrics may include datacenter management-relevant metrics. In some examples, the performance metrics may include a task duration, a central processing unit (CPU) usage, a memory usage, a network usage, a storage volume usage, a storage volume access frequency, a state of change of memory use, or a network traffic change over time, or the like. In some examples, the performance metrics may include predictive metrics such that the metrics may include statistical probabilities as discussed herein. The process of method 200 may continue at block 260.

At block 260, "Is the Task Fingerprint in the Database?", it may be determined whether the task fingerprint may be in the task fingerprint and resource allocation database. In general, such a determination may be made using any suitable technique or techniques. In some examples, it may be determined whether the task fingerprint and a task fingerprint in the database substantially match. In some examples, the task fingerprint may be compared to reference task fingerprints that may already populate the task fingerprint and resource allocation database. In some examples, the comparison may include comparing the results of hash functions related to the task fingerprint and the reference task fingerprints, comparing the results of sub-fingerprint masking related to the task fingerprint and the reference task fingerprints, or comparing the results of tree flow extractions and symbolic representations related to the task fingerprint and the reference task fingerprints, or the like. In general, such comparison may be performed by any suitable resource of a datacenter as discussed herein such as, for example, a task manager. If the task fingerprint may not be in the task fingerprint and resource allocation database, the process of method 200 may continue at block 270. If the task fingerprint may be in the task fingerprint and resource allocation database, the process of method 200 may continue at block 280.

At block 270, "Relate the Task Fingerprint, the Allocated Resource Set, and the Task Behavior in the Database as a New Entry", the task fingerprint, the allocated resource set, and the task behavior may be related in the database as a new entry. In general, the described data may be entered and/or maintained in the database using any suitable techniques and/or data structures. In some examples, the task fingerprint, the allocated resource set, and the task behavior may be related as a table. In some examples, the task fingerprint, the allocated resource set, and the task behavior may be related in the database in a table as discussed with respect to FIGS. 4 and/or 5 herein. In some examples, the task fingerprint, the allocated resource set, and the task behavior may be related in a relational database. As will be appreciated, a variety of information may be related to the discussed task performance in the database in addition to the discussed data such as, for example, a time stamp, data related to performance parameters of the datacenter, or data related to other tasks being concurrently performed by the datacenter, or the like.

At block 280, "Relate the Allocated Resource Set and the Task Behavior to the Task Fingerprint Entry in the Database", the allocated resource set and the task behavior may be related to the task fingerprint in the database as a common task fingerprint entry. In general, the described data may be entered and/or maintained in the database using any suitable techniques and/or data structures. In some examples, the allocated resource set and the task behavior may be related to the task fingerprint as a table or as a table entry, or the like. In some examples, the allocated resource set and the task behavior may be related to the task fingerprint as a table entry as discussed with respect to FIGS. 4 and/or 5 herein. In some examples, the allocated resource set and the task behavior may be related to the task fingerprint in a relational database. As discussed, a variety of additional information may be related to the discussed task performance in the database such as, for example, a time stamp, data related to performance parameters of the datacenter, or data related to other tasks being concurrently performed by the datacenter, or the like.

Method 200 and other techniques discussed herein may be performed to provide a task fingerprint and resource allocation database. Method 200 may be performed any number of times as tasks may be received at a datacenter. As will be appreciated, the task fingerprint and resource allocation database may become more complete, robust, and/or built-out as more tasks may be received, performed, and characterized, as discussed herein. In some examples, the task fingerprint and resource allocation database may be periodically restructured, culled of questionable information, combined or compared with other databases, or the like, to provide proper database management.

As discussed in method 200, a task fingerprint and resource allocation database may be built and updated over time. Such a database may be useful to an implementing datacenter or the database may be used by another datacenter, start up datacenter, or the like. As will be appreciated, method 200 may be discussed in the context of a functional datacenter performing useful client tasks and a resulting task fingerprint and resource allocation database. In some examples, a method using techniques similar to those discussed with respect to method 200 may be used on a series of test tasks to build the task fingerprint and resource allocation database. In such examples, the tasks may be chosen from known common tasks, generated for testing purposes, or the like. Such techniques may offer the advantages of allowing a database structure to be fully and/or predictably populated by the attained test results.

As discussed herein, in some examples, a task fingerprint and resource allocation database may be generated. In some examples, such a database may be utilized for allocating resources. FIG. 3 is an illustration of a table 300 of an example data structure for related task fingerprint, allocated resource set, and task behavior information, arranged in accordance with at least some embodiments of the present disclosure. As shown in FIG. 3, table 300 may include a task fingerprint column 310, a resource set row 320, and corresponding task behavior entries 330 and/or corresponding empty entries 340. In general, table 300 may be a representation of a data set implemented in a database that may be maintained at a datacenter or system as discussed herein.

In general, table 300 may include any number of task fingerprint entries (1, 2, . . . X) in task fingerprint column 310, any number resource set entries (1, 2, . . . Y) in resource set row 320, any number of task behavior entries 330, and any number of empty entries 340. In some examples, task fingerprint entries in task fingerprint column 310 may include task fingerprints of tasks performed by a datacenter, as discussed herein. In general, the task fingerprint entries may include any of the fingerprints discussed herein. In some examples, resource set entries may include allocated resource sets used to perform tasks, as discussed herein.

In general, task behavior entries 330 may include any task behavior information as discussed herein. In general, the task behavior entries may include any information related to performing the task related to the task fingerprint using the resource set at the datacenter. In some examples, the task behavior entries may include performance metrics, as discussed herein. In some examples, the task behavior entries may include datacenter management-relevant metrics. In some examples, the task behavior entries may include a task duration, a central processing unit (CPU) usage, a memory usage, a network usage, a storage volume usage, a storage volume access frequency, a state of change of memory use, or a network traffic change over time, or the like. In some examples, the task behavior entries may include predictive metrics such that the metrics may include probabilities. In some examples, the task behavior entries may include one or more conflict tasks, as discussed herein. In some examples, table 300 may include a pointer or a flag that may, for each task fingerprint, identify a resource set and corresponding task behavior entries that may indicate a preferred resource set. Such a resource set and/or task behavior entries may indicate a reference task behavior profile for use in allocating resources for a closest match reference task fingerprint, as discussed herein. In general, empty entries 340 may include no information and may include entries for task fingerprint and resource set combinations that have evaluated at the datacenter.

FIG. 4 is an illustration of a table of an example data structure for related task fingerprints and task behavior information, arranged in accordance with at least some embodiments of the present disclosure. As shown in FIG. 4, table 400 may include a task fingerprint column 410, a task fingerprint row 420, and corresponding task behavior entries 430 and/or corresponding empty entries 440. As shown, table 400 may also include diagonal task behavior entries 450 that may include task behavior entries that may contain information for instances when the same task has been collocated on a shared resource. In some examples, table 400 may be implemented as an upper or lower triangular matrix or table such that any repeated information may be removed. In some examples, table 400 may be implemented as a full table and the upper triangle may include high priority processes and/or tasks and the lower triangle may include lower priority processes and/or tasks. In general, table 400 may be a representation of a data set implemented in a database that may be maintained at a datacenter or system as discussed herein.

In general, table 400 may include any number of task fingerprint entries (1, 2, . . . X) in task fingerprint column 410 and task fingerprint row 420, any number of task behavior entries 430, and any number empty entries 440. In some examples, task fingerprint entries in task fingerprint column 410 and task fingerprint row 420 may include task fingerprints of tasks performed by a datacenter, as discussed herein. In general, the task fingerprint entries may include any of the fingerprints discussed herein. In some examples, table 400 may be arranged as shown such that task behavior entries 430 may include information related to sharing resources between tasks (as represented by task fingerprints). As such, conflict resources as discussed herein which may cause inefficiencies at the datacenter may be easily identified.

In general, task behavior entries 430 may include any task behavior information as discussed herein. In general, the task behavior entries may include any information related to using shared resources to substantially simultaneously perform the tasks related to the task fingerprints using resources at the datacenter. In some examples, the task behavior entries may include performance metrics, as discussed herein. In some examples, the task behavior entries may include datacenter management-relevant metrics. In some examples, the task behavior entries may include a task duration, a central processing unit (CPU) usage, a memory usage, a network usage, a storage volume usage, a storage volume access frequency, a state of change of memory use, or a network traffic change over time, or the like. In some examples, the task behavior entries may include predictive metrics such that the metrics may include probabilities. In some examples, table 400 may include a pointer or a flag that may, identify corresponding tasks that may cause the discussed inefficiencies, and thereby indicate conflict tasks. In general, empty entries 440 may include no information and may include entries for task fingerprint and resource set combinations that have evaluated at the datacenter.

Figure 5:
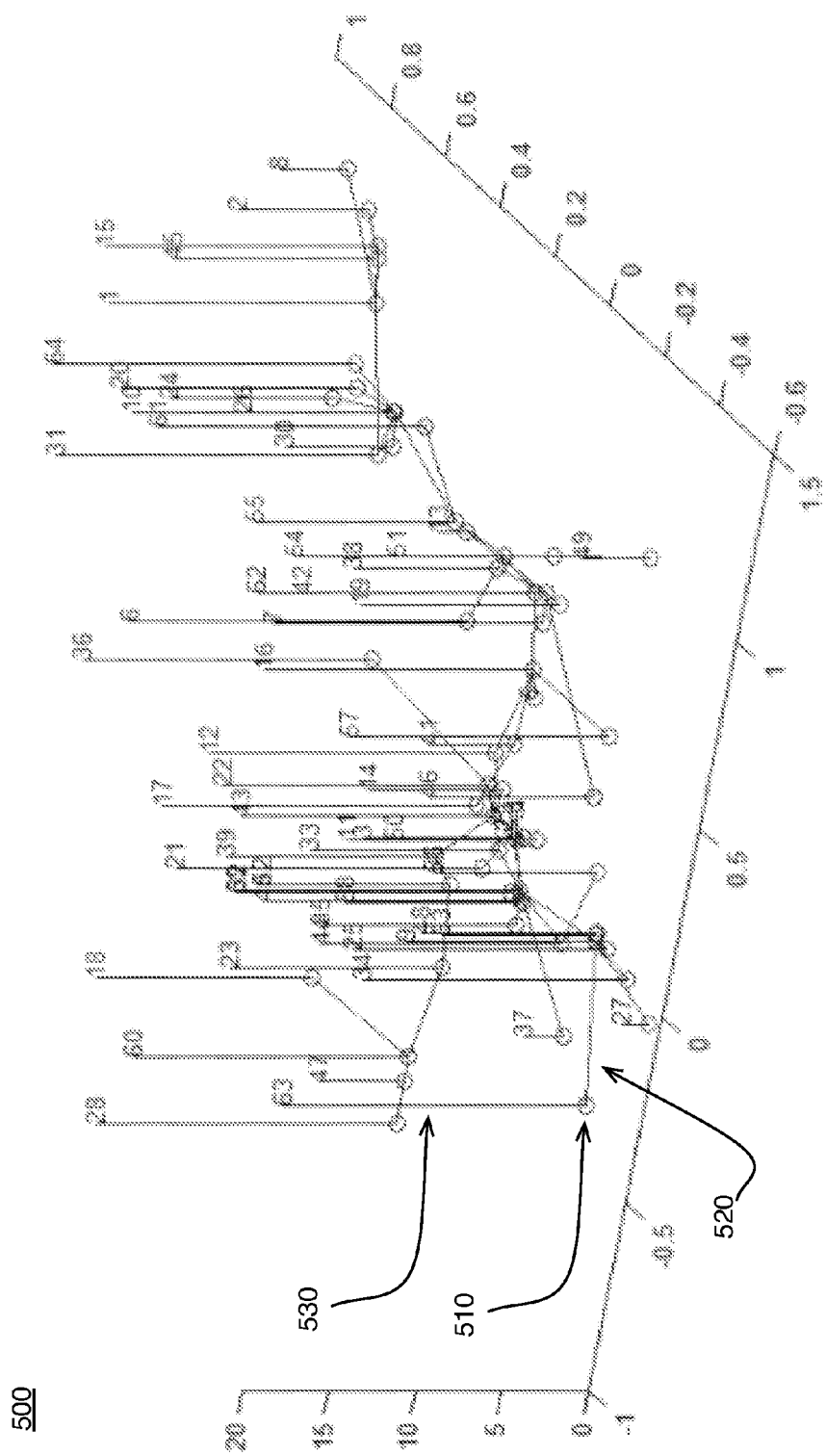
FIG. 5 is an illustration of a diagram of an example tree flow extraction.

As discussed herein, in some examples, a task fingerprint may be generated by performing a tree flow extraction on the received task and providing a symbolic approximation representation of the tree flow extraction. In some examples, tree flow extraction may provide a representation of the behavioral structure of a task and may include components for data content of the task. FIG. 5 is an illustration of a diagram 500 of an example tree flow extraction, arranged in accordance with at least some embodiments of the present disclosure. As shown in FIG. 5, diagram 500 may include code segments 510 (which are numbered 1-63 in diagram 500) that may be linked by connections 520. In some examples, diagram 500 may also include segments 530. In general, code segments 510 may represent execution units in the tree flow extracted task. In general, connections 520 may represent execution flows or links between execution units. In general, segments 530 may indicate the frequency and/or probability that code segments 510 may be called during the execution of the task. As discussed herein, a tree flow extraction such as the example tree flow extraction of diagram 500 may converted to a symbolic approximation format using any suitable technique or techniques.

As discussed herein, in some examples, a task fingerprint may be generated by performing a tree flow extraction on the received task and providing a symbolic approximation representation of the tree flow extraction. In some examples, the tree flow extraction may provide a representation of the behavioral structure of a task and may include components for data content of the task. In some examples, the tree flow extraction may provide a signature related to the task. In general, the tree flow extraction may be performed using any suitable technique or techniques. In some examples, the tree flow extraction may be performed via access a hypervisor may have to a virtual machine file system. In some examples, the tree flow extraction may include performing an extraction on compiled bytecode, scripts, or raw code, or the like of a task. In some examples, the tree flow extraction may be performed during a task package upload and/or installation. Such implementations may provide the advantage of not requiring alterations to datacenter hypervisors. In such implementations, the task fingerprint determined by tree flow extraction may be encrypted and stored alongside a virtual machine at the datacenter.

In general, the system architectures, methods, and databases discussed herein may be implemented in any datacenter, system and/or computing system using any suitable computer readable media or computer program products. Example computer program products are described with respect to FIG. 6 and elsewhere herein. Example systems are described with respect to FIG. 7 and elsewhere herein. In some examples, a datacenter, system, or data cluster, or other system as discussed herein may be implemented over multiple physical sites or locations.

FIG. 6 illustrates an example computer program product 600, arranged in accordance with at least some embodiments of the present disclosure. Computer program product 600 may include machine readable non-transitory medium having stored therein a plurality of instructions that, when executed, cause the machine to allocate datacenter resources according to the processes and methods discussed herein. Computer program product 600 may include a signal bearing medium 602. Signal bearing medium 602 may include one or more machine-readable instructions 604, which, when executed by one or more processors, may operatively enable a computing device to provide the functionality described herein. In various examples, some or all of the machine-readable instructions may be used by the devices discussed herein.

In some implementations, signal bearing medium 602 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). In some examples, signal bearing medium 602 may encompass a machine readable non-transitory medium.

Figure 7:
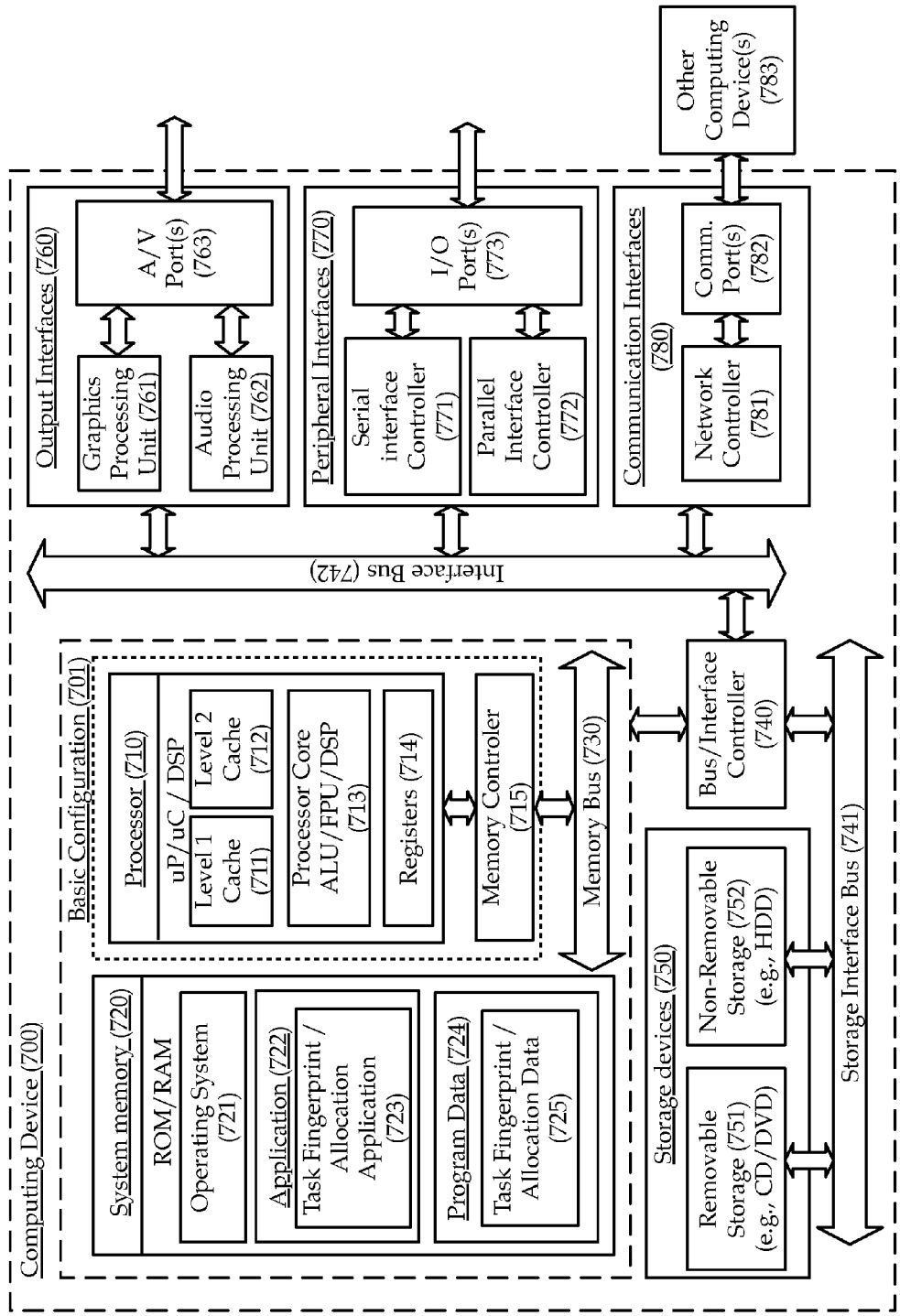
FIG. 7 is an illustration of a block diagram of an example computing device, all arranged in accordance with at least some embodiments of the present disclosure.

FIG. 7 is a block diagram illustrating an example computing device 700, arranged in accordance with at least some embodiments of the present disclosure. In various examples, computing device 700 may be configured to allocate datacenter resources as discussed herein. In various examples, computing device 700 may be configured to allocate datacenter resources as a server system as discussed herein. In one example basic configuration 701, computing device 700 may include one or more processors 710 and system memory 720. A memory bus 730 can be used for communicating between the processor 710 and the system memory 720.

Depending on the desired configuration, processor 710 may be of any type including but not limited to a microprocessor (μP), a microcontroller (μC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include task fingerprint/allocation application 723 that can be arranged to perform the functions, actions, and/or operations as described herein including the functional blocks, actions, and/or operations described herein. Program Data 724 may include task fingerprint/allocation data 725 for use with task fingerprint/allocation application 723. In some example embodiments, application 722 may be arranged to operate with program data 724 on an operating system 721. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 783 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for allocating resources at a datacenter comprising:
    receiving a task at the datacenter;
    generating, at the datacenter, a task fingerprint based at least in part on the received task;
    comparing, at the datacenter, the task fingerprint to a plurality of reference task fingerprints to determine a closest match reference task fingerprint from the plurality of reference task fingerprints;
    determining, at the datacenter, a reference task behavior profile related to the closest match reference task fingerprint; and
    allocating, at the datacenter, one or more resources to perform the received task based at least in part on the reference task behavior profile.

2. The method of claim 1, further comprising:
    performing, at the datacenter, the task using the allocated resources;
    gathering one or more performance metrics based at least in part on the performance of the task; and
    updating, at the datacenter, the reference task behavior profile related to the closest match reference task fingerprint based at least in part on the one or more performance metrics.

3. The method of claim 2, wherein the one or more performance metrics comprise at least one of a task duration, a central processing unit (CPU) usage, a memory usage, a network usage, a storage volume usage, a storage volume access frequency, a state of change of memory use, or a network traffic change over time.

4. The method of claim 2, further comprising:
    receiving a second task at the datacenter;
    generating, at the datacenter, a second task fingerprint based at least in part on the received second task;
    comparing, at the datacenter, the second task fingerprint to the plurality of reference task fingerprints;

determining the closest match reference task fingerprint is the closest match to the second task fingerprint; and
allocating, at the datacenter, second resources to perform the received second task based at least in part on the updated reference task behavior profile.

5. The method of claim 4, further comprising:
performing, at the datacenter, the second task using the second allocated resources;
gathering one or more second performance metrics based at least in part on the performance of the task; and
updating, at the datacenter, the reference task behavior profile related to the closest match reference task fingerprint based on the one or more second performance metrics.

6. The method of claim 5, wherein updating the reference task behavior profile comprises providing a probability based behavior metric including a percentage chance an allocated resource will reach a threshold level.

7. The method of claim 1, wherein the reference task behavior profile comprises one or more conflict tasks and allocating resources to perform the received task includes allocating resources different than those being used by one or more of the conflict tasks.

8. The method of claim 1, wherein generating the task fingerprint comprises performing a hash function on the received task.

9. The method of claim 1, wherein generating the task fingerprint comprises performing a tree flow extraction on the received task and providing a symbolic approximation representation of the tree flow extraction.

10. The method of claim 1, wherein generating the task fingerprint comprises sub-fingerprint masking some of a plurality of subtasks within the task and identifying unmasked subtasks of the task.

11. The method of claim 1, wherein generating the task fingerprint comprises accessing the received task using at least one of a hypervisor level access, a board level access, a processor core level access, or a virtual machine level access.

12. The method of claim 1, wherein the one or more allocated resources comprise at least one of a processor, a memory, a cache space, or a virtual machine.

13. The method of claim 1, wherein the task fingerprint and the closest match reference fingerprint are a perfect match.

14. The method of claim 1, wherein the task comprises at least one of an application or a process.

15. A machine readable non-transitory medium having stored therein instructions that, when executed, cause a datacenter to allocate resources by:
receiving a task;
generating a task fingerprint based at least in part on the received task;
comparing the task fingerprint to a plurality of reference task fingerprints to determine a closest match reference task fingerprint from the plurality of reference task fingerprints;
determining a reference task behavior profile related to the closest match reference task fingerprint; and
allocating one or more resources to perform the received task based at least in part on the reference task behavior profile.

16. The machine readable non-transitory medium of claim 15 having stored therein further instructions that, when executed, cause the datacenter to allocate resources by:
performing the task using the allocated resources;
gathering one or more performance metrics based at least in part on the performance of the task; and
updating the reference task behavior profile related to the closest match reference task fingerprint based at least in part on the one or more performance metrics.

17. The machine readable non-transitory medium of claim 16 having stored therein further instructions that, when executed, cause the datacenter to allocate resources by:
receiving a second task;
generating a second task fingerprint based at least in part on the received second task;
comparing the second task fingerprint to the plurality of reference task fingerprints;
determining the closest match reference task fingerprint is the closest match to the second task fingerprint; and
allocating second resources to perform the received second task based at least in part on the updated reference task behavior profile.

18. A datacenter comprising:
a machine readable medium having stored therein instructions that, when executed, cause the datacenter to allocate resources by:
receiving a task;
generating a task fingerprint based at least in part on the received task;
comparing the task fingerprint to a plurality of reference task fingerprints to determine a closest match reference task fingerprint from the plurality of reference task fingerprints;
determining a reference task behavior profile related to the closest match reference task fingerprint; and
allocating one or more resources to perform the received task based at least in part on the reference task behavior profile; and
a processor coupled to the machine readable medium to execute the instructions.

19. The datacenter of claim 18, wherein the machine readable medium has stored therein further instructions that, when executed, cause the datacenter to allocate resources by:
performing the task using the allocated resources;
gathering one or more performance metrics based at least in part on the performance of the task; and
updating the reference task behavior profile related to the closest match reference task fingerprint based at least in part on the one or more performance metrics.

20. The datacenter of claim 19, wherein the machine readable medium has stored therein further instructions that, when executed, cause the datacenter to allocate resources by:
receiving a second task;
generating a second task fingerprint based at least in part on the received second task;
comparing the second task fingerprint to the plurality of reference task fingerprints;
determining the closest match reference task fingerprint is the closest match to the second task fingerprint; and
allocating second resources to perform the received second task based at least in part on the updated reference task behavior profile.

* * * * *